(12) United States Patent
Das et al.

(10) Patent No.: US 11,527,927 B2
(45) Date of Patent: Dec. 13, 2022

(54) METHOD OF MAKING A MULTI-MATERIAL SEGMENTED STATOR FOR A ROTATING ELECTRIC MACHINE AND A STATOR MADE BY SAID METHOD

(71) Applicant: CRS HOLDINGS, INC., Wilmington, DE (US)

(72) Inventors: Jaydip Das, Cupertino, CA (US); Md Mehedi, Wynnewood, PA (US); Kyle Gehret, Fleetwood, PA (US); Kyle Stritch, Wyomissing, PA (US); Tapan Shah, Coatesville, PA (US)

(73) Assignee: CRS HOLDINGS, LLC, Wilmington, DE (US)

( * ) Notice: Subject to any disclaimer, the term of this patent is extended or adjusted under 35 U.S.C. 154(b) by 319 days.

(21) Appl. No.: 16/689,790

(22) Filed: Nov. 20, 2019

(65) Prior Publication Data
US 2020/0161944 A1 May 21, 2020

Related U.S. Application Data

(60) Provisional application No. 62/769,765, filed on Nov. 20, 2018.

(51) Int. Cl.
*H02K 1/02* (2006.01)
*H02K 1/18* (2006.01)
*H02K 1/16* (2006.01)
*H02K 1/14* (2006.01)
*H02K 15/02* (2006.01)

(52) U.S. Cl.
CPC .............. *H02K 1/02* (2013.01); *H02K 1/146* (2013.01); *H02K 1/18* (2013.01); *H02K 15/022* (2013.01); *H02K 1/16* (2013.01); *H02K 2201/15* (2013.01)

(58) Field of Classification Search
CPC .......... H02K 1/141; H02K 1/02; H02K 1/185; H02K 1/12; H02K 1/16; H02K 1/06; H02K 1/14; H02K 1/146; H02K 15/024; H02K 15/022; H02K 2201/15; H02K 1/18
USPC ..... 310/216.001, 216.004, 216.007, 216.009
See application file for complete search history.

(56) References Cited

U.S. PATENT DOCUMENTS

| | | | |
|---|---|---|---|
| 6,784,588 B2 | 8/2004 | DeCristofaro et al. |
| 6,960,862 B2 | 11/2005 | Hill |
| 7,224,096 B2 | 5/2007 | Meacham et al. |
| 8,415,854 B2 | 4/2013 | Saban et al. |

(Continued)

FOREIGN PATENT DOCUMENTS

| | | |
|---|---|---|
| EP | 0938181 A1 | 8/1999 |
| JP | 2000341889 A | 12/2000 |

(Continued)

OTHER PUBLICATIONS

Varun, S., "Stator Design of an Electric Motor," printout of PowerPoint Slide Deck, Nov. 15, 2019, pp. 1-28.

(Continued)

*Primary Examiner* — Alexander A Singh
(74) *Attorney, Agent, or Firm* — Dann, Dorfman, Herrell and Skillman, P.C.

(57) ABSTRACT

A method of making a stator for a rotating electrical machine in which a tooth segment from a high saturation induction material and a yoke segment from a silicon steel material. The tooth segment is bond to yoke segment, thereby producing a stator with at least two magnetic saturations.

18 Claims, 5 Drawing Sheets

(56) References Cited

U.S. PATENT DOCUMENTS

| | | | |
|---|---|---|---|
| 2010/0019598 A1 | 1/2010 | Saban | |
| 2010/0237736 A1* | 9/2010 | Alfermann | H02K 1/02 310/216.091 |
| 2014/0042853 A1* | 2/2014 | Shimizu | H02K 29/03 310/156.01 |
| 2017/0237303 A1 | 8/2017 | Fahrenbach | |

FOREIGN PATENT DOCUMENTS

| | | |
|---|---|---|
| JP | 2003180044 A | 6/2003 |
| JP | 2005287134 A | 10/2005 |
| JP | 201172148 A | 4/2011 |
| WO | 0249190 A1 | 6/2002 |
| WO | 2015062884 A2 | 5/2015 |
| WO | 2017043601 A1 | 3/2017 |

OTHER PUBLICATIONS

EPO, Written Opinion of the ISA, PCT/US2019/062455, dated Feb. 13, 2020, 9 pages.

\* cited by examiner

METHOD OF MAKING A MULTI-MATERIAL SEGMENTED STATOR FOR A ROTATING ELECTRIC MACHINE AND A STATOR MADE BY SAID METHOD

REFERENCE TO PRIOR APPLICATION

This application claims the benefit of provisional application No. 62/769,765 filed on Nov. 20, 2018, the entire disclosure of which is incorporated herein by reference.

BACKGROUND OF THE INVENTION

Field of the Invention

This invention relates generally to stators for rotating electric machines, and in particular to a method of making such parts using multiple soft-magnetic materials.

Description of the Related Art

The known stators for rotating electric machines are typically made from a plurality of stacked laminations of a soft magnetic material. The known stator structure consists of a yoke that is ring-shaped and a plurality of teeth that extend radially inward from the yoke. It has been recognized that for different types of rotating electric machines, the teeth and the yoke experience different magnetic flux densities when the electric machine is operating. More specifically, the teeth are usually subject to significantly higher magnetic flux densities than the yoke portion. Because of that phenomena, it has been proposed to make such components from different magnetic materials in order to improve the efficiency of a rotating electric machine. See, for example U.S. Pat. No. 6,960,862 B2; US 2017/0237303 A1; WO 02/49190; and WO 2015/062884.

Although the multi-material concept is recognized, the art has not provided a viable method of making such components. Nor has the art recognized any physical limitations on the geometry of such components in order for the use of multiple soft magnetic materials to be effective for performance and economical for worthwhile cost benefit, compared to the standard soft magnetic materials currently in use.

SUMMARY OF THE INVENTION

In accordance with a first aspect of the present invention, there is provided a method of making a stator for a rotating electrical machine that includes the following steps:
  a. Stamping or cutting laminations for the tooth segments of the stator from high saturation induction sheet/strip material;
  b. Stamping or cutting laminations for the yoke segment(s) from silicon steel sheet/strip material;
  c. Stacking the tooth segment laminations to form a tooth segment stack;
  d. Heat treating the tooth segment stack to obtain a desired combination of magnetic and mechanical properties;
  e. Stacking the yoke segment laminations to form a yoke segment stack;
  f. Bonding the tooth segment laminations together with an adhesive material and curing the adhesive material;
  g. Bonding the yoke ring segment laminations together with an adhesive material and curing the adhesive material;
  h. Assembling and bonding the tooth segment stack to the yoke segment stack with the adhesive material to form the stator, and then
  i. Heat treating the assembled stator to cure the adhesive material.

In step a., the high saturation induction material may be coated with an insulation layer or may be uncoated. In step d., the high saturation induction material may be heat treated either as strips or in the stacked condition. The stator yoke a In accordance with a second aspect of the present invention, there is provided a second method of making a stator for a rotating electrical machine that includes the following steps.
  a. Stamping or cutting laminations for the stator, including the tooth and yoke portions, from high saturation induction sheet/strip material;
  b. Stamping or cutting laminations for the stator from silicon steel stator sheet/strip material;
  c. Stacking the laminations by alternating a lamination of the high saturation induction material and a lamination of the typical stator material to form the stator;
  d. Bonding the laminations with an adhesive material and curing the adhesive material; and then
  e. Heat treating the assembled laminations to obtain a desired combination of magnetic and mechanical properties.

In a further embodiment of this second process, the thicknesses of the alternating laminations can be varied depending on the magnetic and mechanical properties desired. In this regard, the laminations of one of the magnetic materials in a stack can be thicker than the laminations of the other magnetic material. In an alternative embodiment of the second process, the laminations of both magnetic materials in a stack can be of same thicknesses and the thickness of a layer of one of the magnetic materials can be increased by stacking together two or more laminations of the one magnetic material.

In accordance with a further aspect of this invention there is provided a stator for a rotating electrical machine comprising a ring-shaped yoke and a plurality of teeth extending radially inward from the yoke, wherein the width of a tooth (t) and the annular width (d) of the ring-shaped yoke are related such that t is less than d (t<d), and up to 75 volume percent, preferably 20-75 volume percent, of the stator material is a high saturation induction material and the remainder of the stator material is a soft magnetic material such as a silicon steel or other soft magnetic alloy having a saturation induction that is lower than the saturation induction of the tooth material. Each lamination thickness of high induction material in the tooth can range from 0.05 mm to 0.5 mm, while the yoke material lamination thickness can range from 0.15 mm to 0.5 mm.

In a further embodiment of this aspect of the invention, the stator may comprise a ring-shaped segment and a plurality of tooth segments extending radially inward from the ring-shaped segment. The tooth segments may comprise an entire tooth, a portion of a tooth, or a tooth and a portion of the yoke.

Here and throughout this application the term "high saturation induction" means a saturation magnetic induction ($B_{sat}$) of about 2 to 2.4 tesla (T) which may be provided by using an iron-cobalt alloy. The term "yoke material" means a material characterized by having a saturation magnetic induction of about 1.7 to 2.1 tesla (T) which may be provided by using a 2 to 4 wt. % silicon containing steel or an iron-cobalt alloy material.

BRIEF DESCRIPTION OF THE DRAWINGS

The foregoing summary as well as the following detailed description will be better understood when read in connection with the drawings wherein.

DETAILED DESCRIPTION

The process according to the present invention is directed to improving the operating performance of a rotating electrical machine such as an electric motor or generator by utilizing two different soft magnetic materials to make the stator portion of the electrical machine. In connection with this aspect of the invention the steps that constitute the process are selected based on the geometry of the stator.

Figure 1:
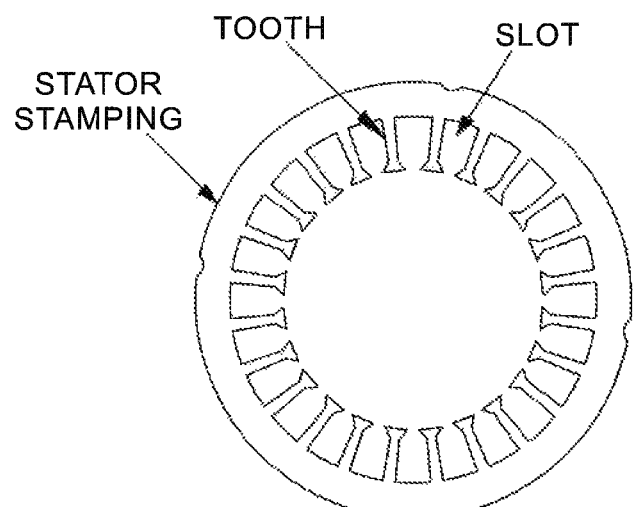
FIG. 1 is a plan view of a single lamination for a stator stack having a known geometry.
Figure 2:
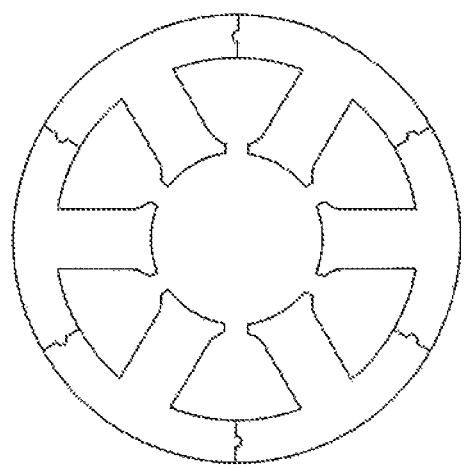
FIG. 2 is a plan view of a segmented lamination for a stator stack having a second known geometry.
Figure 3:
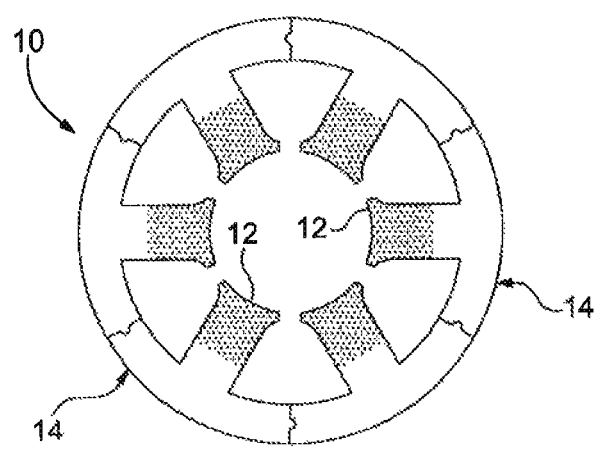
FIG. 3 is a schematic view of a segmented lamination for a stator stack made in accordance with a first embodiment of the present invention.

Referring now to FIG. 3, a stator 10 contains a tooth 12 and a back iron (yoke) section 14. Several yoke sections 14 can be joined to form the stator 10. Alternatively, the stator 10 may consist of a solitary yoke section (not shown). The tooth 12 may be positioned midway on the yoke section 14, as shown in FIG. 3 or one or more tooth 12 can be positioned anywhere on the yoke 14, depending on a required configuration.

The tooth 12 is preferably made from a soft magnetic alloy that is characterized by a high saturation induction ($B_{sat}$) of about 2-2.4 tesla (T). Examples of suitable magnetic alloys may include some combinations of Carbon, Nickel, Manganese, Silicon, Cobalt, Vanadium, Chromium, Copper, aluminum, and Iron. Commercially available magnetic alloys include CARTECH® HIPERCO® 50A alloy, CARTECH® HIPERCO® 50 alloy, CARTECH® HIPERCO® 27 alloy, and CARTECH® HYPOCORE® alloy. The yoke section 14 is preferably made from a magnetic alloy that is characterized by having a saturation magnetic induction of about 1.7 to 2.1 tesla (T). Suitable materials for the yoke section 14 include silicon irons such as M19.

In an embodiment, the tooth 12 of the assembled stator 10 may constitute at least about 20% of the volume of the stator 10. In such an embodiment, the high saturation induction magnetic alloy is used only in the tooth 12 of the stator 10. In other embodiments, the tooth 12 may constitute 50% or more of the volume of the stator, for example, up to 75%. In the latter arrangement, the tooth 12 may include portions of the yoke section 14. In other words, the high saturation induction magnetic alloy will be replacing the silicon iron material proximate the tooth 12.

Figure 4:
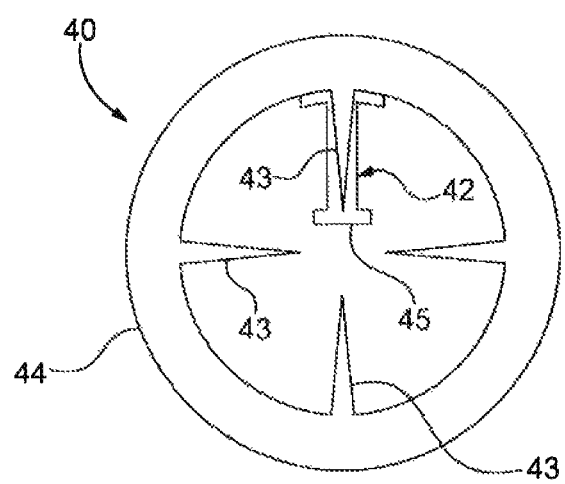
FIG. 4 is a schematic view of single lamination for a stator stack made in accordance with a second embodiment of the present invention.
Figure 10:
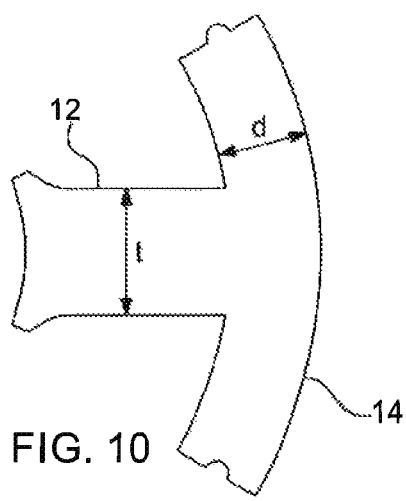
FIG. 10 is a schematic view of a tooth and yoke segment of a stator for a rotating electric machine.

In an alternate arrangement is illustrated in FIG. 4 in which a stator 40 has a tooth portion 42 extending radially inward from a yoke portion 44. The tooth portion 42 consists of a stem 43 which also extends radially inward from the yoke 44 and a cap portion 45 that engages and is proximate the stem 43. The cap portion 45 is preferably made from a soft magnetic alloy that is characterized by a saturation induction (Bsat) of about 2-2.4 tesla (T) as described above relative to FIG. 3. Whereas the yoke portion 44 and the stem 43 are made from material with saturation induction in the range of 1.7 to 2 teslas. It has been found that the segmented construction of the stator 40 according to the invention as shown in FIGS. 3 and 4 is effective when the width of a stator tooth (t) is less than the annular width (d) of the yoke, i.e., t<d. See, for example, FIG. 10.

In an embodiment, a stator 10 of the present invention is preferably made in accordance with the following process steps. In a first step, the laminations for the tooth 12 segments are stamped or cut from sheet or strip forms of the soft magnetic alloy having a high saturation induction. Next, laminations for the yoke section 14 are stamped or cut from sheet/strip material having lower saturation induction. The yoke section 14 laminations may be formed as full rings or as ring segments. The yoke section 14 laminations are then stacked to form a yoke portion. The yoke portion containing the stacked yoke section 14 laminations may be formed as a ring segment, as shown in FIG. 3.

The tooth 12 segment laminations are stacked to form a tooth portion and then heat treated to obtain a desired combination of a magnetic property and a mechanical property. The tooth 12 segment laminations are bonded together with an adhesive material, such as epoxy, which is then cured in the prescribed manner for the adhesive material. For example, curing some adhesives can be accomplished with heating a device to be cured in a heater or exposing the adhesive to a certain wavelength of light.

Remisol EB-548 is an example of adhesive for bonding stack laminations used in stators. The choice of adhesive and/or bonding material is based upon many factors, including at least its adhesion strength, thermal stability, water and chemical resistance, electrical insulation properties, magnetic properties, vibration control, and impact resistance. The yoke portion laminations are bonded together with a suitable adhesive material, such as epoxy. In an alternative arrangement, the yoke portion laminations can be interlocked. The tooth segments and the yoke segment or segments are assembled and can be bonded, welded, press fitted, riveted, or diffused together.

Any suitable adhesive material may be utilized to form the stator assembly. Alternatively, a soft magnetic particle filled epoxy or adhesive can be used to improve the magnetic flux flow between the tooth 12 segment and yoke segment. The soft magnetic particle filled epoxy can contain spherical, spheroidal, flake shaped soft magnetic particles in 20-70 vol. %. In addition, the adhesive material can be thermally conductive, but electrically insulating with thermal conductivity in the 0.5 to 5 W/mK range. After the tooth and yoke segments are assembled using the adhesive material, the assembled segments are heat treated in the prescribed manner to cure the adhesive material.

Figure 5A:
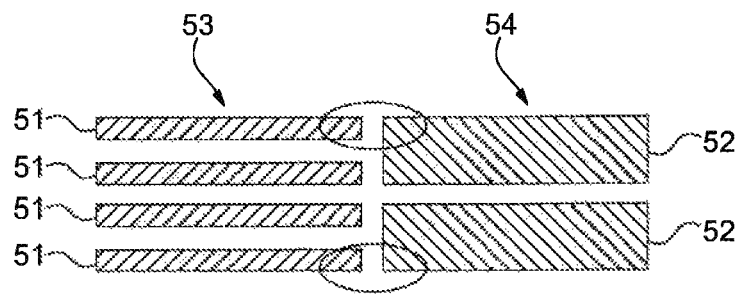
FIG. 5A is a schematic representation of lamination stacks for a stator made in accordance with the present invention prior to bonding of the laminations and joining of the lamination stacks in accordance with a first process according to the invention.
Figure 5B:
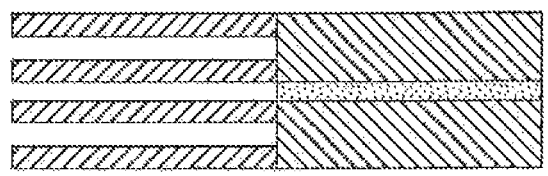
FIG. 5B is a schematic representation of the lamination stacks of FIG. 5A after bonding of the laminations and joining of the stacks by welding.

One technique for assembling and bonding the tooth segment to the yoke ring or to a yoke ring segment will now be described with reference to FIGS. 5A and 5B. In a first step as shown in FIG. 5A, a tooth segment laminations 51 and a yoke ring laminations 52 are stacked. In an alternate embodiment, tooth segment laminations 51 and yoke ring laminations 52 can be interlocked to form tooth stack 53 and yoke ring stack 54, respectively. A tooth stack 53 is joined to a yoke ring stack 54, preferably by welding or any other suitable joining method along the outer facing edges of the two stacks, indicated by an oval 55 in FIG. 5A. The joined stacks 53 and 54 are heat treated to develop the desired combination of magnetic properties and mechanical properties. The tooth segment laminations 51 can be coated with an electrically insulation layer, for example, an oxide film if the stacks are uncoated prior to assembly. Finally, the laminations in each stack are bonded together using a suitable adhesive material that is applied by capillary or vacuum impregnation.

Figure 6A:
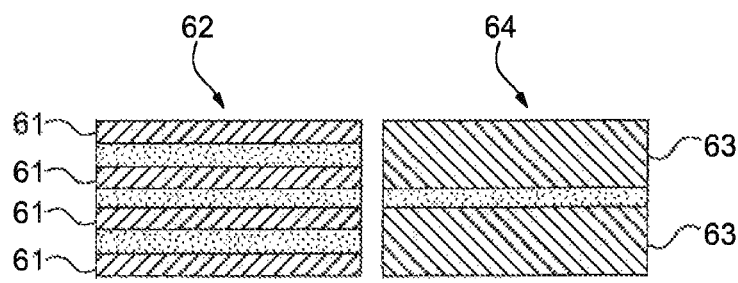
FIG. 6A is a schematic representation of lamination stacks for a stator made in accordance with the present invention in which the laminations are bonded prior to joining of the lamination stacks in accordance with a second process according to the invention.
Figure 6B:
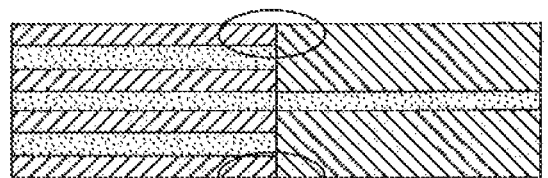
FIG. 6B is a schematic representation of the lamination stacks of FIG. 6A after joining of the stacks by welding.

Another technique for assembling and bonding the tooth segment to the yoke ring or to a yoke ring segment will be described with reference to FIGS. 6A and 6B. In this technique, the tooth laminations and the yoke laminations are heat treated and insulation coated prior to stacking. The tooth laminations 61 are stacked and bonded together to form the tooth segment 62. The yoke laminations 63 are stacked and bonded together to form the yoke segment 64. The tooth laminations 61 and the yoke laminations 63 are bonded together by applying the adhesive material to facing surfaces of the laminations. Welding or any other suitable joining method along the outer facing edges of the two stacks, indicated by an oval 65 in FIG. 6B. The adhesive material can be applied by spraying, by roller coating, or by dipping the stacked laminations and allowing the adhesive to penetrate by capillary action. The adhesive is then cured in the known manner as prescribed by the adhesive manufacturer. The tooth segment stack 62 is joined to the yoke stack 64 preferably by welding or the other methods discussed in the first technique.

Figure 7A:
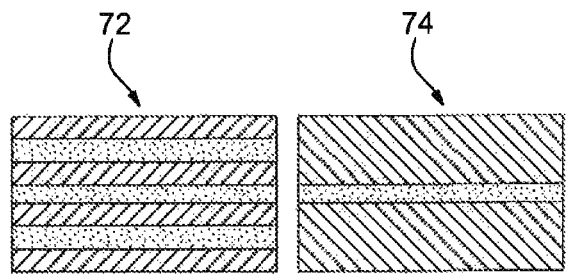
FIG. 7A is a schematic representation of lamination stacks for a stator made in accordance with the present invention in which the laminations are bonded prior to joining of the lamination stacks in accordance with the second process according to the invention.
Figure 7B:
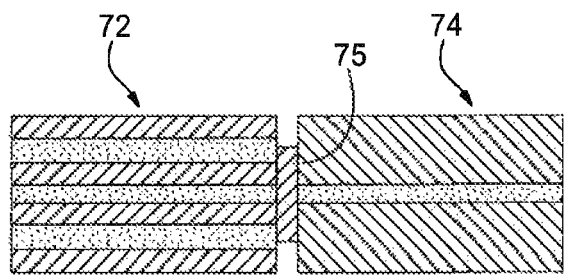
FIG. 7B is a schematic representation of the lamination stacks of FIG. 7A after joining of the stacks with a thermally conductive adhesive.

In a first alternative of the joining step, the tooth segment stack 62 is bonded to the yoke stack 64 using the same adhesive for bonding the individual laminations in each stack. As a further alternative shown in FIGS. 7A and 7B, tooth stack 72 is bonded to yoke stack 74 with an adhesive 75 that may consist of a thermally conductive, electrically insulating epoxy. Further still, the tooth segment stacks 72 can be bonded to the yoke segment stack(s) 74 with a magnetic particle filled, thermally conductive epoxy adhesive.

Figure 11A:
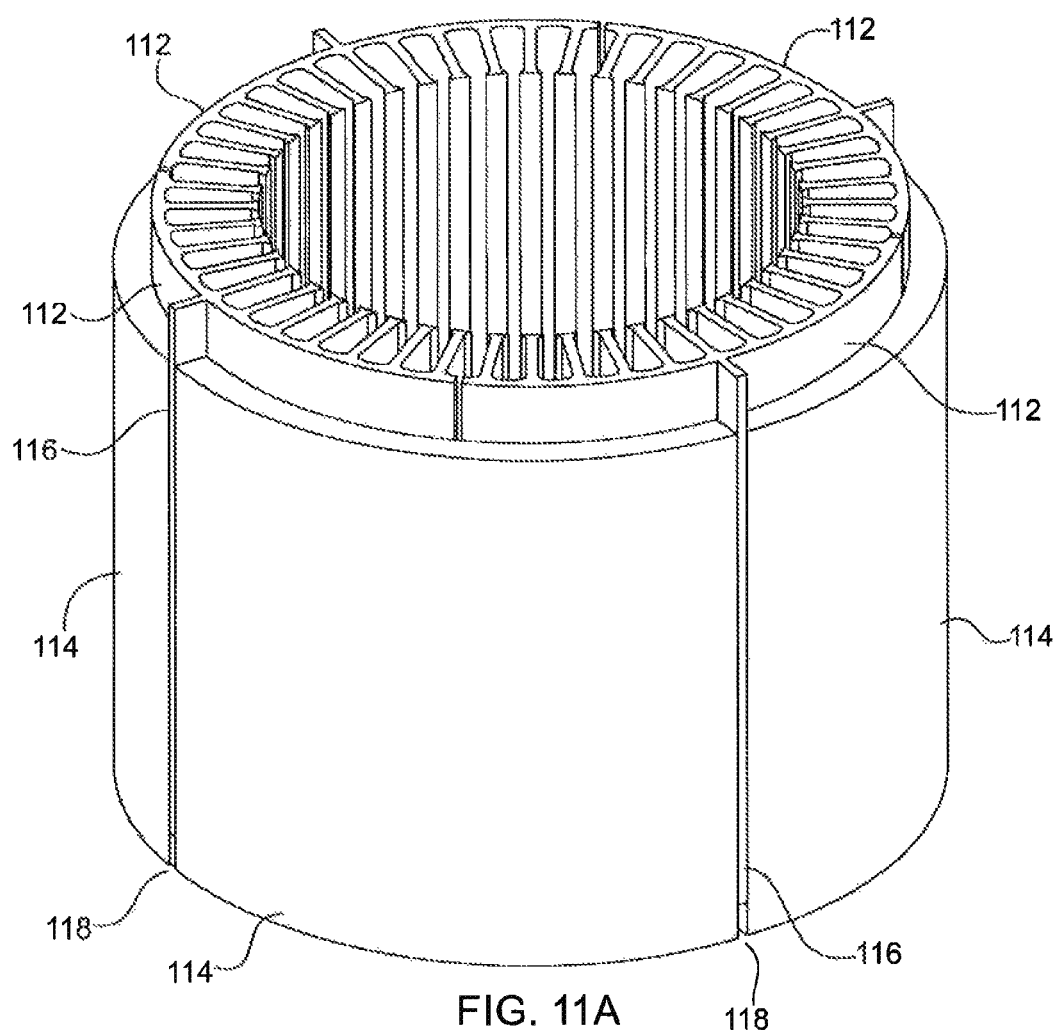
FIG. 11A is a schematic view of a stator assembly according to the invention having an interlocking mechanism between the tooth portion segments and the yoke portion segments.
Figure 11B:
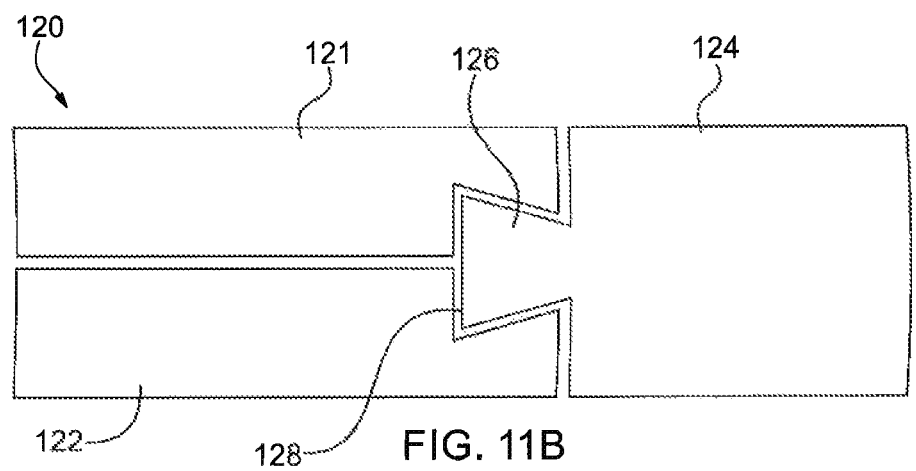
FIG. 11B is a schematic view of a portion of a stator assembly according to the invention having an alternative interlocking mechanism between the tooth portion segments and the yoke portion segments.

In an additional embodiment, the tooth and yoke segments may be stamped or cut to form extended sections that form male and female latches after stacking and bonding as shown in FIGS. 11A and 11B. Such sections provide further mechanical integrity to the multi-material stator. Referring now to FIG. 11A there is shown a stator assembly 110 in accordance with the present invention. The stator assembly 110 includes a plurality of tooth segments 112 and a plurality of yoke ring segments 114 adjacent to and surrounding the tooth segments. The tooth segments 112 are formed of a soft magnetic alloy have a high saturation induction and the yoke ring segments are formed of a soft magnetic alloy having a lower saturation induction than the tooth segments, as described above. In this embodiment of FIG. 11A there are four tooth segments 112 and four yoke ring segments 114. However, more or fewer tooth and/or yoke ring segments can be used depending on the size of and design requirements for the stator. Each of the tooth segments 112 has a key or rib 116 formed thereon that extends radially outward toward the yoke ring segments 114. A key way or rib slot 118 is formed between adjacent yoke ring segments 114. The key/rib 116 of a tooth ring segment 112 engages with a corresponding key way/slot 118 when the tooth segments are assembled with the yoke ring segments. This construction provides a latching arrangement that prevents relative rotational movement between the tooth segments 112 and the yoke ring segments 114.

FIG. 11B shows an alternative latching arrangement to that shown in FIG. 11A. The stator assembly 120 includes tooth segments 121 and 122 assembled to a yoke ring segment 124. As described above, the tooth segments are formed of a soft magnetic alloy having a high saturation induction and the yoke ring segments are formed of a soft magnetic alloy have a lower saturation induction. The yoke ring segments have a key or rib 126 formed thereon that extends radially into a key way or notch 128 that is formed between the tooth segments 121 and 122 at the ends of the tooth segments nearest to the yoke ring 124.

Figure 8:
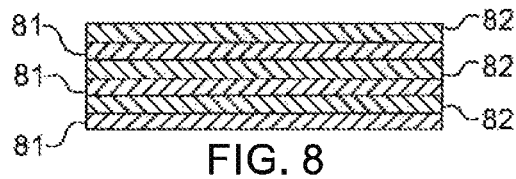
FIG. 8 is a schematic view of a first embodiment of a layered stack of different soft magnetic materials according to another aspect of the present invention.
Figure 9:
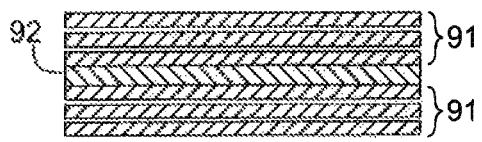
FIG. 9 is a schematic view of a second embodiment of a layered stack of different soft magnetic materials according to the present invention.

Another multi-material approach according to the present invention would be useful for those segmented stator designs that experience high induction/flux density in both the teeth and the yoke regions of the stator. This situation can arise when the tooth width is similar to or greater than the width of the annular yoke dimensions (t≥d). See, FIG. 10. This embodiment includes bonding laminations of different materials in alternating layers. In an aspect of the invention, the alternating layers may include alternating laminations of the different magnetic materials having substantially the same thickness, e.g., 0.35 mm thick laminations 81 of a high saturation induction, soft magnetic alloy and 0.35 mm thick laminations 82 of silicon-iron as shown in FIG. 8. In another arrangement, the different magnetic alloys may be layered in different volume ratios and/or thicknesses, e.g., two or three 0.2 mm thick sheets 91 of the high saturation induction soft magnetic alloy alternated with a single 0.2 mm thick sheet 92 of silicon-iron as shown in FIG. 9. The thicknesses of the alternating layers are selected for particular performance needs. By varying the respective layer thicknesses, it would be possible to control the stator induction and losses along with optimizing motor performance and cost benefits.

The terms and expressions which are employed in this specification are used as terms of description and not of limitation. There is no intention in the use of such terms and expressions of excluding any equivalents of the features shown and described or portions thereof. It is recognized that various modifications are possible within the invention described and claimed herein.

What is claimed is:

1. A stator for a rotating electric machine comprising:
a ring-shaped yoke comprising:
a first magnetic alloy having a first magnetic saturation induction;
an inner surface that surrounds a central opening; and
a plurality of stem portions extending radially inward from the inner surface at spaced intervals; and
a plurality of cap portions engaged with and covering the stem portions;
wherein the cap portions comprise a second magnetic alloy that is characterized by a second magnetic saturation induction that is greater than the magnetic saturation induction of the first magnetic alloy.

2. The stator claimed in claim 1 wherein each cap portion is dimensioned to cover the length of the stem portion.

3. The stator claimed in claim 1 wherein the first magnetic alloy is an iron-silicon alloy having a magnetic saturation induction of 1.7 to 2 tesla and the second magnetic alloy is an iron-cobalt alloy having a magnetic saturation induction of 2 to 2.4 tesla.

4. The stator claimed in claim 1 wherein the ring-shaped yoke comprises a plurality of stacked laminations of the first magnetic alloy and means for joining the stacked laminations of the first magnetic alloy.

5. The stator claimed in claim 4 wherein the means for joining the stacked laminations of the first magnetic alloy is selected from the group consisting of a weld along outside edges of the stacked laminations, a diffusion bond between adjacent laminations, and an adhesive material between adjacent laminations.

6. The stator claimed in claim 1 wherein the cap portions comprise a plurality of stacked laminations of the second magnetic alloy and means for joining the stacked laminations of the second magnetic alloy.

7. The stator claimed in claim 1 wherein:
the ring-shaped yoke comprises a plurality of stacked laminations of the first magnetic alloy and means for joining the stacked laminations of the first magnetic alloy; and
the cap portions comprise a plurality of stacked laminations of the second magnetic alloy and means for joining the stacked laminations of the second magnetic alloy.

8. A stator for a rotating electrical machine comprising:
a ring-shaped yoke having a curved inner surface that surrounds a circular central opening;
a toothed portion comprising a ring-shaped backwall and a plurality of teeth extending from an inner surface of the ring-shaped backwall, said plurality of teeth being positioned at spaced intervals around the inner surface of said ring-shaped backwall, said toothed portion being located in the central opening of said ring-shaped yoke;
means for joining the toothed portion and the ring-shaped yoke around the curved inner surface of the ring-shaped yoke; and
means for preventing relative rotation between the toothed portion and the ring-shaped yoke;
wherein the toothed portion comprises a first plurality of stacked laminations formed from a first magnetic alloy that has a high magnetic saturation induction; and
the ring-shaped yoke comprises a second plurality of stacked laminations formed from a second magnetic alloy that has a lower magnetic saturation induction than the first magnetic alloy.

9. The stator claimed in claim 8 wherein the ring-shaped yoke comprises two or more arcuate segments.

10. The stator claimed in claim 9 wherein the toothed portion comprises two or more arcuate segments.

11. The stator claimed in claim 8 wherein the means for preventing relative rotation comprises a key extending radially outward from the ring-shaped backwall of the toothed portion and a keyway extending radially inward in the ring-shaped yoke such that the key engages with the keyway when the toothed portion is joined to the ring-shaped yoke.

12. The stator claimed in claim 8 wherein the means for preventing relative rotation comprises a keyway extending radially outward in the ring-shaped backwall and a key extending radially inward from the ring-shaped yoke such that the key engages with the keyway when the toothed portion is joined to the ring-shaped yoke.

13. The stator claimed in claim 8 wherein the first magnetic material is an iron-cobalt alloy having a magnetic saturation induction of 2 to 2.4 tesla and the second magnetic material is an iron-silicon alloy having a magnetic saturation induction of 1.7 to 2 tesla.

14. The stator claimed in claim 8 wherein the means for joining the toothed portion and the ring-shaped yoke is selected from the group consisting of a weld along outside edges of the toothed portion and the ring-shaped yoke, a diffusion bond between the toothed portion and the ring-shaped yoke, and an adhesive material between the toothed portion and the ring-shaped yoke.

15. The stator claimed in claim 14 wherein the adhesive material comprises particles of a soft magnetic alloy dispersed therein.

16. The stator claimed in claim 8 wherein the laminations of the ring-shaped yoke have thicknesses that are greater than the thicknesses of the laminations of the toothed portion.

17. The stator claimed in claim 8 wherein the laminations formed of the first magnetic alloy are stacked alternately with the laminations of the second magnetic alloy.

18. The stator claimed in claim 17 wherein the laminations formed of the first magnetic alloy have the same thickness as the laminations of the second magnetic alloy.

* * * * *